(12) United States Patent
Watterson et al.

(10) Patent No.: US 8,054,490 B2
(45) Date of Patent: Nov. 8, 2011

(54) AUTOMATIC JOB ROUTING FOR WIDE FORMAT PRINT DISTRIBUTION

(75) Inventors: Randall F. Watterson, Glendale, AZ (US); Timothy G. Moore, Phoenix, AZ (US); Keith W. Rupp, Glendale, AZ (US); Jason G. Stehle, Phoenix, AZ (US)

(73) Assignee: OCE-Technologies B.V., Venlo (NL)

( * ) Notice: Subject to any disclaimer, the term of this patent is extended or adjusted under 35 U.S.C. 154(b) by 982 days.

(21) Appl. No.: 11/987,564

(22) Filed: Nov. 30, 2007

(65) Prior Publication Data

US 2008/0204794 A1    Aug. 28, 2008

Related U.S. Application Data

(60) Provisional application No. 60/861,720, filed on Nov. 30, 2006.

(51) Int. Cl.
*G06K 15/00* (2006.01)

(52) U.S. Cl. .................. 358/1.15; 358/1.1; 358/1.13

(58) Field of Classification Search .............. 358/1.1, 358/1.13, 1.15, 1.18, 401, 468, 296
See application file for complete search history.

(56) References Cited

U.S. PATENT DOCUMENTS

| | | | |
|---|---|---|---|
| 7,154,630 B1 * | 12/2006 | Nimura et al. | 358/1.18 |
| 7,265,860 B2 * | 9/2007 | Ferlitsch | 358/1.15 |
| 7,408,657 B2 * | 8/2008 | Suzuki et al. | 358/1.13 |
| 2004/0136028 A1 * | 7/2004 | Rabb | 358/1.15 |
| 2007/0127063 A1 * | 6/2007 | Fertlitsch et al. | 358/1.15 |

* cited by examiner

*Primary Examiner* — Thomas D Lee
(74) *Attorney, Agent, or Firm* — Birch, Stewart, Kolasch & Birch, LLP

(57) ABSTRACT

A method for dispatching a job for printing an original document from an original document set to a printer. The method includes routing the job to a printer group based on the characteristics of the original document via a dispatcher. When exactly one printer group has all capabilities required by the job, the job is routed to the one printer group. When more than one printer group has all capabilities required by the job, the dispatcher routes the job to a printer group that requires the shortest estimated time to complete the job. When no printer group has all capabilities required by the job, the dispatcher notifies a user via the operating screen for manual treatment of the job.

7 Claims, 11 Drawing Sheets

Fig. 2

| File | Edit | View | Tools | Help | | | | | | |
|---|---|---|---|---|---|---|---|---|---|---|

| Job Center | | | | | | |
|---|---|---|---|---|---|---|
| Folders | Incoming | | | | | Properties |
| | Order ID | From | Received | Documents | Set Count | |
| − Job Center | −+Delivery Method: Local Delivery Service | | | | | 1-03-1 |
| − − Incoming | -1-03-1 | jan jacobs | 5/18/2006 | 1 | | - Billing |
| − + Completed | −+ Delivery Method: Postal Service − Priority Mail | | | | | Bill to   jan jacobs |
| − − Print Center | -1-12-1 | jack brown | 5/19/2006 | 1 | 1 | Number |
| − + TDS450 | -1-20-1 | jack brown | 5/24/2006 | 1 | 1 | Reference |
| − + TDS700 | -1-11-1 | jack brown | 5/19/2006 | 1 | 1 | Reimbursable   No |
| − + TDS8xx | -1-27-1 | jack brown | 5/24/2006 | 1 | 1 | Payment |
| − − Document Center | -1-17-1 | jack brown | 5/24/2006 | 1 | 1 | Reason |
| − − Scan Center | -1-15-1 | jack brown | 5/24/2006 | 1 | 1 | - Delivery |
| − + TDS800-ms1 | -1-10-1 | jack brown | 5/19/2006 | 2 | 1 | Due Date |
| − + TDS700-600 | | | | | | Delivery Method  Local |
| − + TDS700 | | | | | | Recipient  jan jacobs |
| − + TDS450 COP | | | | | | - Finishing |
| − + Recycle Bin | | | | | | Box   No |
| | | | | | | Double Sided  No |
| | Document Set Editor | | | | | Edging  Staple |
| | Paper Settings | Sheet Details | | | | Fold  No |
| | Sheet Name | Sequence | Image Size | Paper Size | Alignment | Rotat | Collate  Yes |
| | - 0222d201 | 1 | 1180.0 x 840 | ISO A0:11 | None | None |

Fig. 7

AUTOMATIC JOB ROUTING FOR WIDE FORMAT PRINT DISTRIBUTION

CROSS-REFERENCE TO RELATED APPLICATIONS

This application claims priority under 35 U.S.C. §119(e) to U.S. Provisional Application No. 60/861,720 filed on Nov. 30, 2006, the entirety of which is expressly incorporated herein by reference.

BACKGROUND OF THE INVENTION

1. Field of the Invention

The present invention relates to a method for dispatching a job for a given set of documents to the most suited print device available.

2. Description of Background Art

In wide format printing, originals in an original document set typically may differ in characteristics, such as format and the like. Also, print specifications for each of the documents typically will be different. In order to carry out a job for such a document set, many variables, print strategies, output requirements, fold methods, etc. need to be analyzed prior to device selection and print distribution. This is a cumbersome task for an operator.

SUMMARY OF THE INVENTION

It is an object of the present invention to relieve the burden for the operator to a large extent.

The object is achieved in a method for dispatching a job for printing one or more original documents from an original document set to a printer, each original document in the original document set having characteristics. The method comprises the step of routing a job to a printer group of a plurality of printer groups based on the characteristics of the original document via a dispatcher, the dispatcher comprising a notifying device that notifies a user for manual treatment of the job; wherein when exactly one printer group of the plurality of printer groups has all capabilities required by the job, routing the job to said one printer group; when more than one printer group of the plurality of printer groups has all capabilities required by the job, routing the job to a printer group of the plurality of printer groups that requires the shortest estimated time to complete the job; and when no printer group has all capabilities required by the job, notifying a user via the notifying device for manual treatment of the job.

The term "job" encompasses print requests, scan requests, folding requests, orders or work orders. The equivalent wordings may be used and may be replaced by the term job.

Based on a number of criteria, documents that are distinguished within a given collection or set of documents to be printed, may be directed to a particular print device to achieve the most optimal and preferred output. For the purposes of the present invention, "optimal and preferred output" is defined as printing documents as requested in as short an amount of time as possible while maintaining document set integrity.

According to the present invention, printers are combined into printer groups to create entities with the capabilities of all included printers. For example, a printer group may be created that contains a wide-format black-and-white printer, a wide-format color printer, and a small format printer.

The user has the flexibility to create printer groups of printers to fit his/her needs. A printer group may be created for each printer, the printer group comprising a single printer. Furthermore, a printer group may be created comprising a number of wide-format printers and a number of small-format printers. Printer groups may be based on media sizes or media types.

A job that arrives at a printer group is distributed among printers within the printer group according to the capabilities of the printers and load-balancing properties that may be set.

In an embodiment of the present invention the method comprises a subsequent step of routing the job further within the printer group for each original document, based on a file format supported by the printer group, media supported by the printer group and folding capabilities of the printer group, wherein when exactly one printer of the printer group has all required capabilities required by the job, routing the job to said one printer; when more than one printer of the printer group has all required capabilities, routing the job based on a load balancing property configured for the printer group; and when no printer of the printer group has all required capabilities required by the job, blocking routing of the job to the printer group.

In an embodiment of the method according to the present invention, the load balancing property is one of a group parallel load balancing property, a sequential load balancing property, and consecutive load balancing property. If the parallel load balancing property has been configured, all printers in the group will be used to print a substantially equal number of a number of sets of the original document. If the sequential load balancing property has been configured, each print job will be printed on a single printer and a page count of all printers will be kept substantially equal. If the consecutive load balancing property has been configured, each job will be sent to a single printer and a job count of all printers will be kept substantially equal.

An embodiment of the present invention is directed to a method for dispatching a job for printing a number of sets of one or more original documents from an original document set to a printer group, configured with a load balancing property, the load balancing property being one of the group consisting of a parallel load balancing property, a sequential load balancing property, and a consecutive load balancing property as explained above.

In an embodiment of the present invention the characteristics of an original document may be a file format, folding requirements, media types and media sizes.

The dispatcher may use a managing workstation configured with an operating screen displaying the defined printer groups.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 shows an operating screen of a managing workstation, suitable for use in an embodiment of the method according to the present invention;

FIG. 7 shows a properties screen of the managing workstation of FIG. 2 displaying properties of a selected incoming job;

DETAILED DESCRIPTION OF THE PREFERRED EMBODIMENTS

Figure 1:
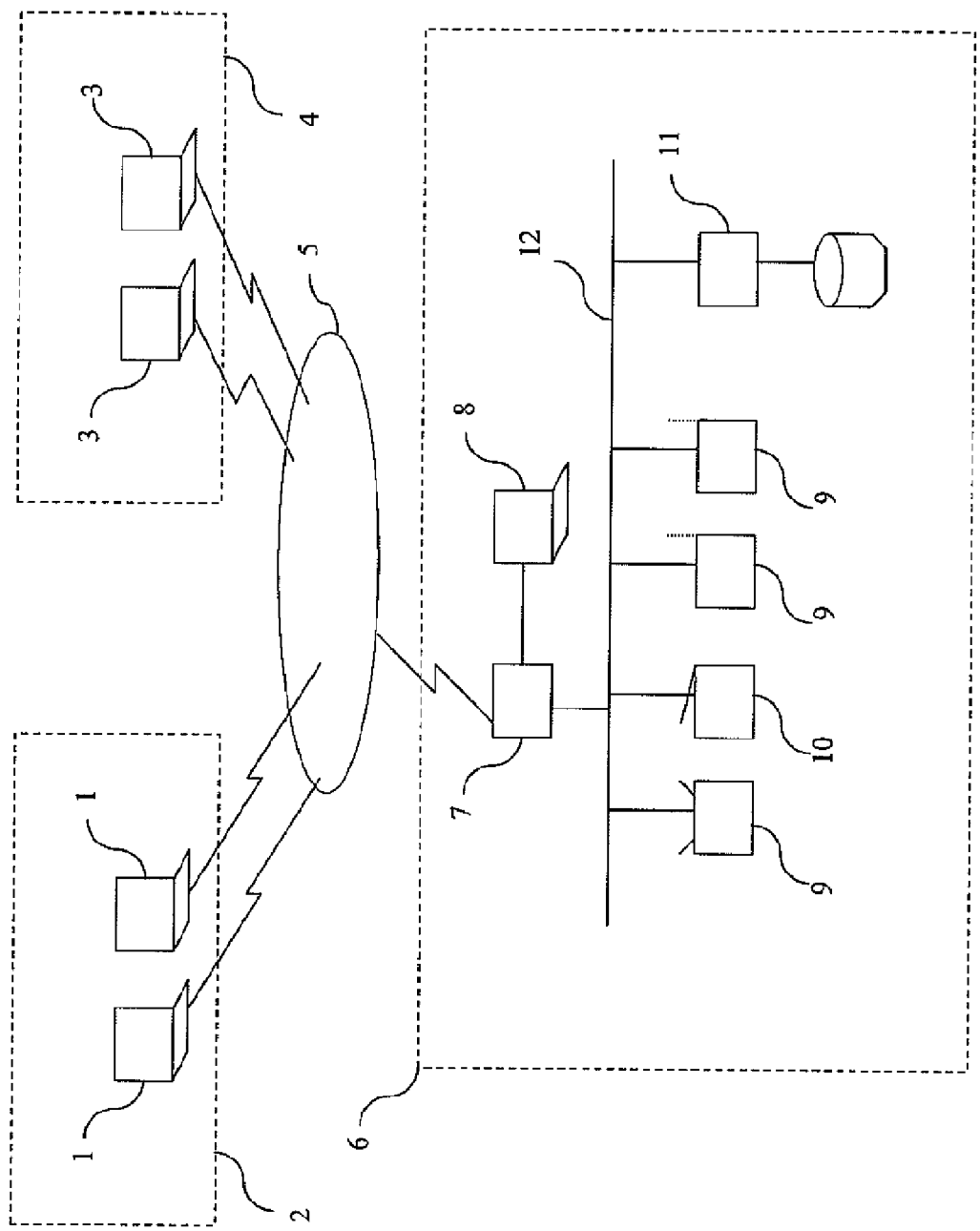
FIG. 1 is a diagram showing a network system configured for employing an embodiment of the method according to the present invention.

The present invention will now be described with reference to the accompanying drawings, wherein the same reference numerals have been used to identify the same or similar elements throughout the several views.

FIG. 1 schematically illustrates a network system configured for using an embodiment of the method according to the present invention. The network system comprises one or more client workstations 1 on a location 2 and one or more client workstations 3 on a location 4, connected via a network 5 to a job printer site 6. The network 5 may be, for example, a wide area network, such as the Internet. The job printer site 6 comprises an entry station 7, connected to one or more managing workstations 8. The entry station 7 is connected via an internal network 12, such as a local area network, to one or more printers 9, one or more scanners 10 and a document storage station 11 for storing print files. The client workstations 1, 3 may be geographically spread over a variety of locations 2, 4. The printers 9 are typically located at the job printer site 6. However, the printers 9 may be geographically spread. Customers may upload drawings from a client workstation 1, 3 to the job printer site 6 for storage. Thereafter, the uploaded drawings are available for ordering print outs by the same customer or by other customers upon invitation. In order to obtain print outs, a customer at a client workstation 1, 3 may create a print job and submit the job towards the job printer site 6.

An incoming print job may be made available in a job management service, also referred to as a job center at a managing workstation 8 at the job printer site 6. At the managing workstation, a job may be checked by an operator in order to determine whether further preparation is necessary, e.g. scanning of paper originals and the like. The print order form may be further administratively handled and checked regarding accounting issues. Further, it may be checked if required finishing options are available at the job printer site 6; if not, the job may be rerouted to another site.

The job may then be routed to a print management service, also referred to as a print center, or it is stored in a document repository, also referred to as a document center. Both services are available at the managing workstation 8 of the job printer site 6.

The job may be placed in a print queue and/or stored in a document storage station 11 for reprint in dependence on a request of a customer. After printing, the printed output may be physically distributed to the addressees indicated and invoices may be prepared and logged.

The job management service may manage jobs from various sources. For example, it may provide operator facilities for changing job specifications, routing jobs to printers and performing other job management tasks. It may have facilities for routing incoming jobs to the print center automatically.

The print management service provides complete centralized print management. It enables the operator to, among other things, balance the workload among printers, cancel print jobs, redirect print jobs, reprint jobs, and change print quantities.

The scan management service, also referred to as a scan center, provides central management of scanners and the ability to index, catalog, print and archive scanned images.

The document management service may be a local document archive that provides retrieval of print-ready documents. Actual storage may take place at the document storage station 11; operation may be provided via the functionality of the document center offered at the managing workstation 8.

Figure 2:
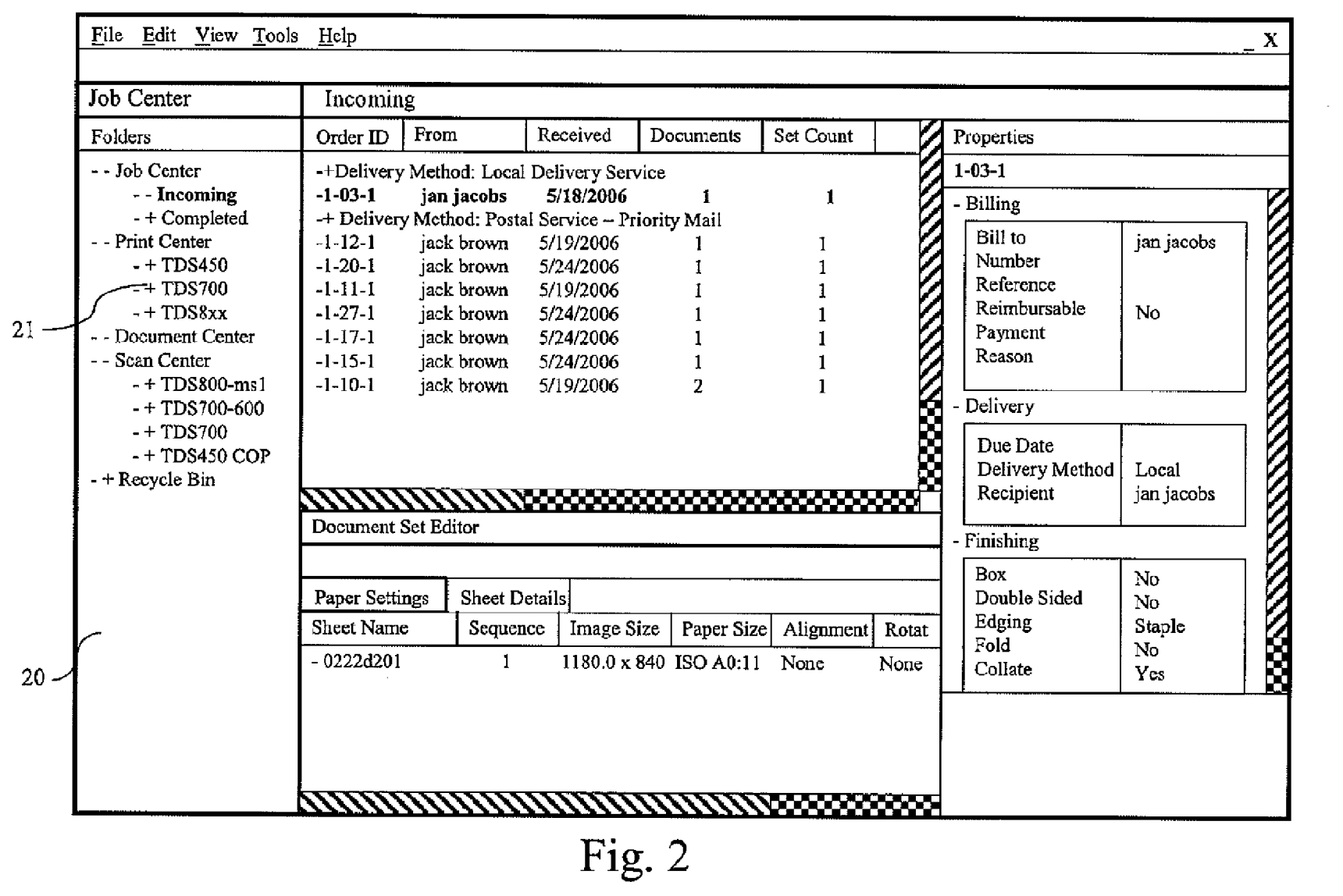

FIG. 2 shows an operating screen of the managing workstation 11 (FIG. 1). In the left pane 20, in a tree like structure, the mentioned services are made available. On a sublevel node, in the tree like structure in the left pane 20, printer group names 21 may be visible.

According to the present invention, a number of printers at disposal at a job printer site may be grouped into a number of printer groups. The printer groups may be defined by particular combinations of capabilities provided by the printers in the printer group. In such an embodiment, a printer group has the capabilities of all included printers. Each time a printer is added to the system, the printer may be added to one or more printer groups. Thus, by combining printers in a printer group, entities are created with the capabilities of all included printers. For example, the operator may create a printer group that contains a wide-format black-and-white printer, a wide-format color printer, and a small format printer.

The user has the flexibility to create groups of printers to fit his/her needs. A single printer group for each printer may be created. Furthermore, a printer group for one or more wide-format printers and one or more small-format printers may be created. Printer groups may be based on media sizes or media types. An incoming order will be assigned to a printer group.

Orders that arrive at a printer group are distributed among printers within the printer group according to the capabilities of the printers and load-balancing properties that have been set for the printer group.

Figure 3:
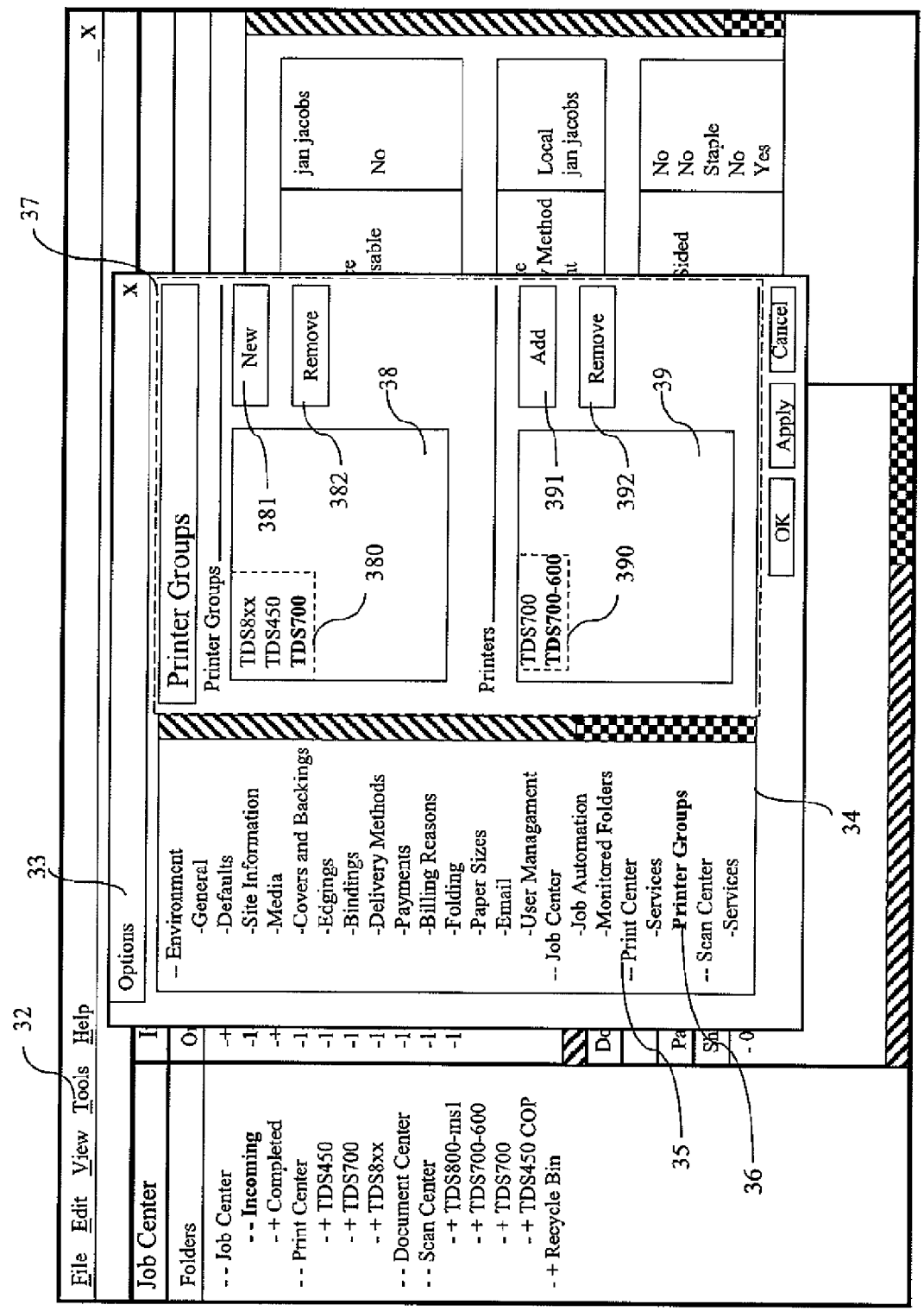
FIG. 3 shows an options screen of the managing workstation of FIG. 2 displaying defined printer groups.

The system may provide facilities for managing printer groups 30 as shown in FIG. 3. Printer groups 30 may be created and removed and printers may be added to or removed from a printer group. To create a printer group a tools menu button 32 is available on top of the screen with a tools option (not shown). When selecting this tools option, a screen 33 appears, comprising in a left option pane 34 a tree like structure comprising a top node 35 named "Print Center" with a subnode 36 named "Printer Groups." If subnode 36 named "Printer Groups" is selected, a right pane 37 of the options screen 33 may show an upper list 38 of already defined printer groups 380, for example "TDS8xx," a first button 381 for creating a new printer group and a second button 382 for deleting an existing printer group, in particular the printer group selected in the upper list 38. If a printer group 380 is selected, the right pane 37 may show a lower list 39 of printers 390 belonging to the printer group selected in the upper list 38. FIG. 3 further shows the lower list 39 of the printer group named "TDS700," comprising the printers named "TDS700" and "TDS700-600" and a third button 391 for adding a printer to the printer group selected in the upper list 38 and a fourth button 392 for removing a printer, selected in the lower list 39, from the printer group selected in the upper list 38.

In this way, a printer group is made accessible for the operator in the left pane 34 of the operating screen as a subnode 36 of the Print Center node 35. Leaves of the subnode 36 are the actual printers that are members of the printer group of the subnode 36.

Figure 4:
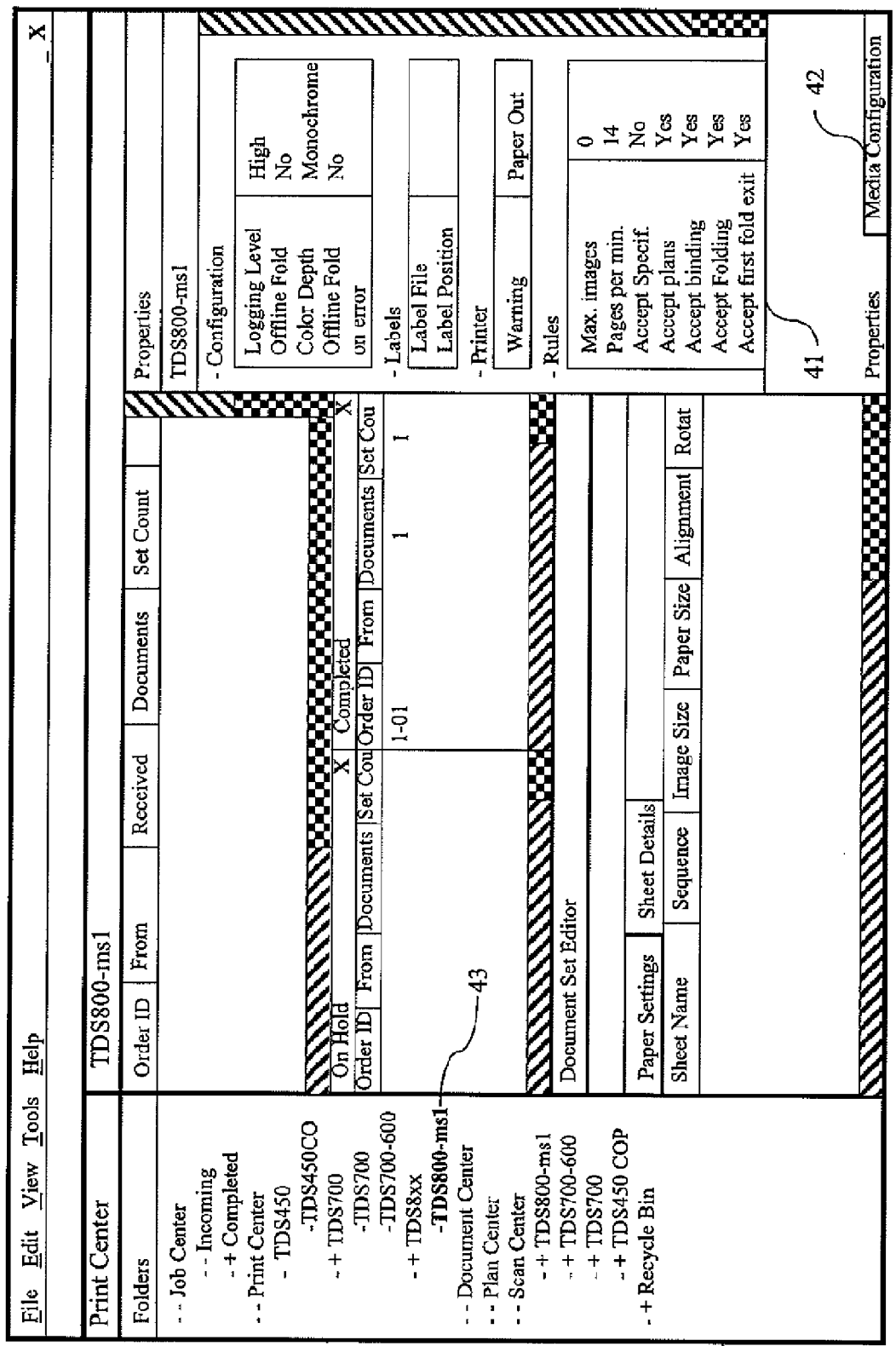
FIG. 4 shows a properties screen of the managing workstation of FIG. 2 displaying properties of a selected printer from a printer group.

In FIG. 4, at the right hand side of the operating screen, a properties pane 41 is shown after selection of a printer 43 in the left pane 40. The properties pane 41 shows properties of the selected printer 43.

In the illustrated embodiments, the following capabilities of the selected printer 43 are considered in this perspective:
 finishing: available finishing characteristics may be fold, roll, output tray, punch, staple and drill;
 rated performance: rated performance may be referred to in terms of printed pages per minute (PPM), print device pages per minute or speed of output;
 maximum of images: print device total pages allowed to be printed in a given time frame or the capacity at which each device can handle a given set of documents within a given time frame;
 quality: print device overall quality includes ink, resolution and durability, etc.;
 capabilities: print device output capabilities may be expressed in monochrome versus color, color RGB, CMYK and color space capabilities, for example 24 bit, 32 bit and true color; and
 destination: important aspects of the destination are the final destination delivery location, the method of delivery and the due date/time.

Figure 5:
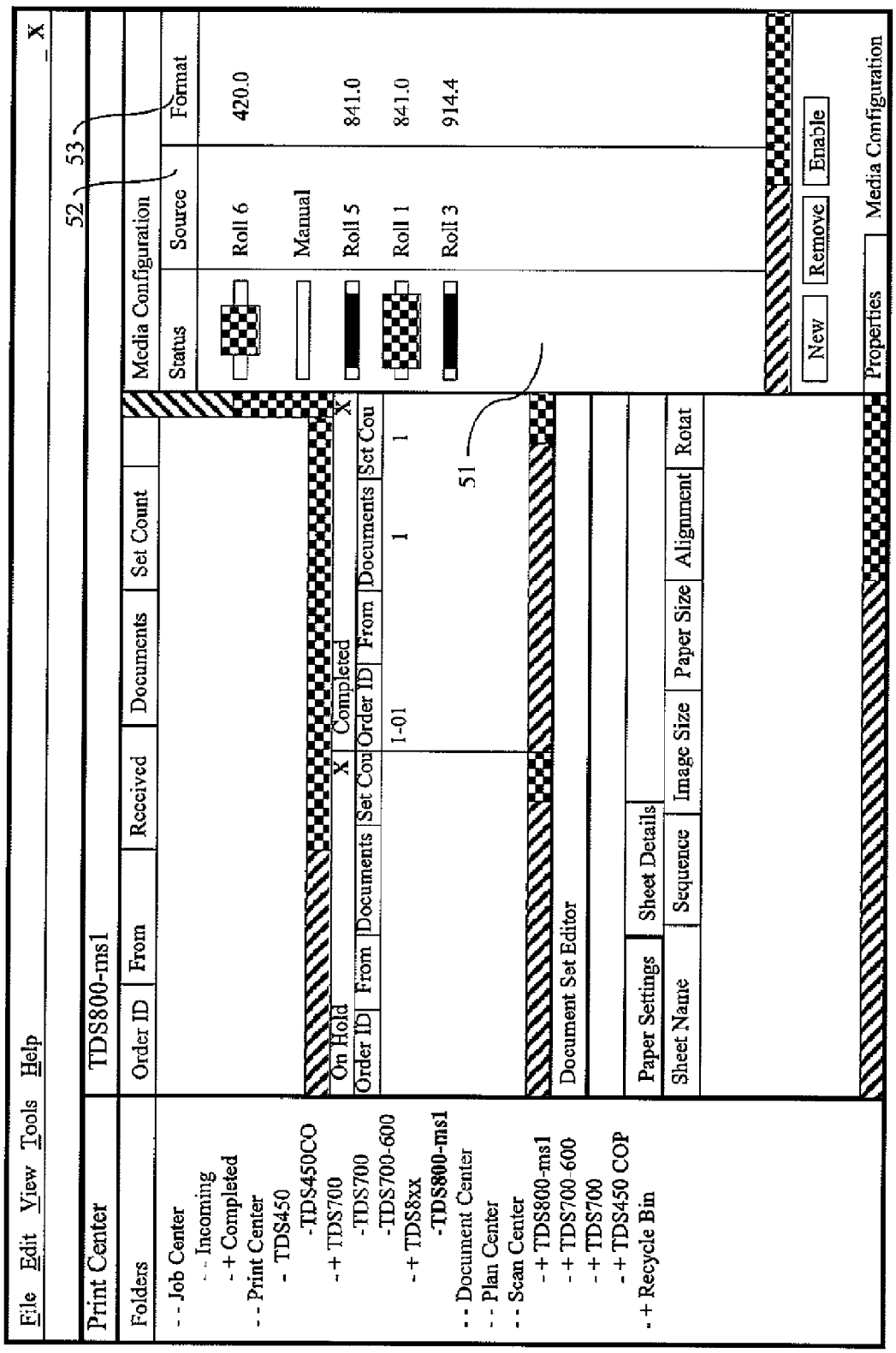
FIG. 5 shows a media configuration screen of the managing workstation of FIG. 2 displaying status, source and format of usable media.

Also, media available for the selected printer group are shown under the "media configuration" tab 42. If pressing the "media configuration" tab 42, a media configuration pane 51 appears as shown in FIG. 5. The media configuration pane 51 comprises a column 52 containing media types (substrate, weight, color, cost, amount available, etc.) and a column 53 containing media sizes (the physical size of the printed output document).

Figure 6:
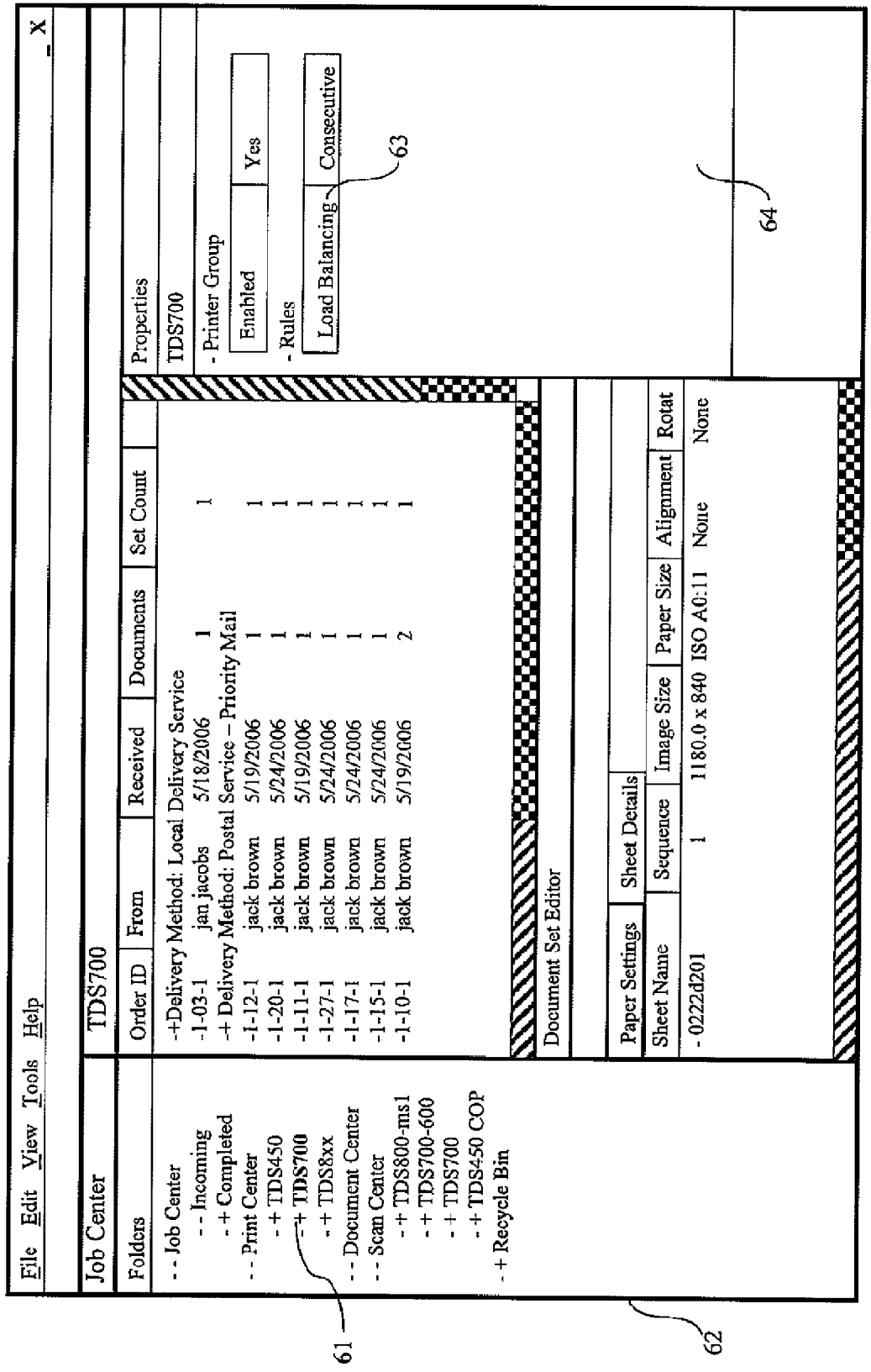
FIG. 6 shows a properties screen of the managing workstation of FIG. 2 displaying properties of a selected printer group.

Within a printer group, load balancing settings can be made. One of, e.g. three load balancing schemes, may be set by the user: parallel load balancing, sequential load balancing and consecutive load balancing. FIG. 6 shows the operating screen with respect to the balancing schemes. By selecting a printer group 61 in a left pane 62, a load balancing property 63 can be set in a properties pane 64 at the right.

These load balancing schemes are hereafter elaborated in more detail. At a print job site, a number of printers and finishers are available with all kind of options ready to process a diversity of print jobs. It is advantageous that jobs are distributed over the printers in such a way that an optimum degree of occupation will be reached, however taking into account other constraints like deadlines for distributing the printed output. According to the present invention, load balancing will occur across like print devices or when considering a print device group (a collection of print devices pooled together to appear or work as one print device).

Three main load balancing criteria may be used to determine how the requested document types will ultimately be distributed to the print devices or print device groups.

Figure 10B:
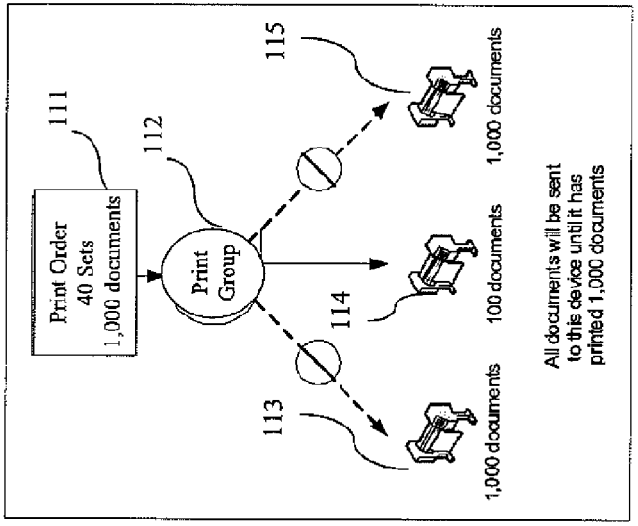
FIG. 10b shows a diagram of an example of sequential load balancing.
Figure 10A:
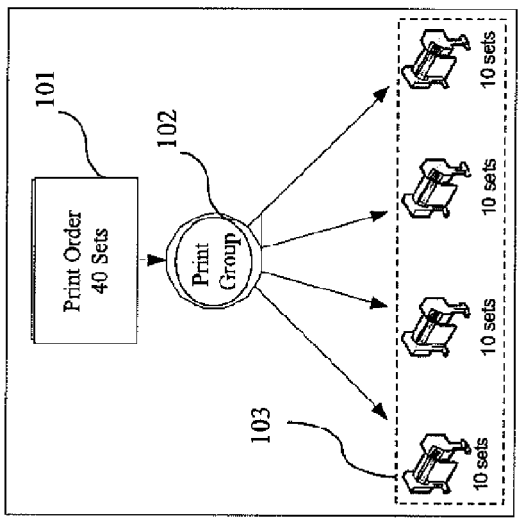
FIG. 10a shows a diagram of an example of parallel load balancing.

Parallel load balancing is a method of distributing multiple sets of document(s) across many like devices in order to utilize all print devices. This may ensure that an equal number of documents are sent to each device over the same period of time. Parallel load balancing focuses on printing the submitted order in the shortest amount of time possible by utilizing all available suitable devices equally. The formula for applying parallel load balancing is applied each time a print order is received by a printer group and does not take into account how the printers in the printer group were utilized for previous orders. In case of parallel load balancing, a time to print may be calculated by adding up a number of pending images and a number of incoming images, and dividing the addition by a number of copies per minute. As an example, FIG. 10a shows a print order 101 of forty sets being allocated to a printer group 102, comprising for example a number of printers 103. Each printer has the capabilities required to print the sets. Each printer may print ten sets of the print order.

Sequential load balancing is a method of distributing multiple sets of document(s) across many like devices in order to maintain an equal amount of printing on each device. This technique maintains equal usage of printing across all devices so that the burdens of each device are approximately equal. Sequential load balancing takes into account previous usage of devices within a printer group. Its primary goal is to equalize usage of devices over an extended period of time. As an example, FIG. 10b shows a print order 111 of forty sets, each set comprising one thousand documents. The print order may be allocated to a printer group 112, comprising a first printer 113, a second printer 114 and a third printer 115, each printer having the capabilities to print the print order 111. The first printer 113 has already printed one thousand documents as well as the third printer 115. The second printer 114 has printed one hundred documents. The documents of print order 111 may be sent to the second printer 114 until the second printer 114 has printed one thousand documents.

Figure 10C:
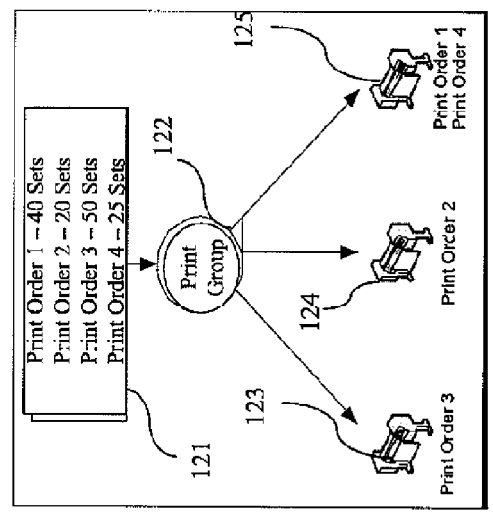
FIG. 10c shows a diagram of an example of consecutive load balancing.

Consecutive load balancing is a method of distributing multiple sets of document(s) across many like devices in order to simply utilize each device. This method does not ensure usage is equal; however, it does ensure each device obtains, in consecutive order and repeating the device's order, a given print request. An example in FIG. 10c shows a list 121 of print orders, a first print order of forty sets, a second print order of twenty sets, a third print order of fifty sets and a fourth print order of twenty-five sets. Each print order may be allocated to a printer group 122, comprising three printers, each printer having capabilities to print the print orders, a first printer 123, a second printer 124 and a third printer 125. The third printer 125 may print the first print order and the fourth print order, the second printer 124 may print the second print order and the first printer 123 may print the third print order.

In order for any of the above load balancing techniques to be utilized, each print device must report or provide specific output capabilities into the system in order to achieve all automatic distribution requirements. These include at least one of the following device capabilities:
 print speed—for example entered in copies per time interval based on the operator's or manufacturer's estimations/specifications;

maximum number of images per order—for example entered as a whole value, this number may be used to protect lower volume print devices from obtaining print submissions that would "normally" require higher volume or faster print devices. If the value is set to 0, this may indicate to the system that no threshold for maximum number of images is set;

monochrome versus color—indicates if the device capable of outputting or printing in monochrome and/or in color;

media options—media type, weight, color, handling capabilities, etc.; and finishing—device finishing capabilities such as folding, punching, stapling, etc.

A job may be carried out on a set of original images, further referred to as a document set. A document set may consist of a number of files and their properties, including the properties that specify how the files are to be printed. The term "document set" is used throughout the system: each time the term refers to a collection of original documents or files with their properties. It may be used as a work order in the job center; a print set in the print center; an issue in the document center; and a scan set in the scan center.

FIG. 7 shows a tree pane 71 on the left hand side. A job center node 72 may be clicked if an operator wants to indicate a desired order. On a file menu 73, a New option (not shown) may be pointed to and afterwards an option "New order" may be clicked (not shown). A dialog box that opens shows a document set editor. Files may be added, properties of files may be changed, files may be processed and WYSIWYP ("What You See Is What You Print") previews may be generated.

Jobs uploaded or defined as above arrive at the job center. At the job center, the operator may modify the jobs. Upon selecting "incoming" in the tree pane 71 under the job center 72, a list of incoming jobs is shown in an incoming job pane 75. Upon selecting an incoming job in the incoming job pane 75, a properties pane 76 at the right hand side displays the properties of the job. Inn the document set editor pane 74, files making up the job are shown (one in the case shown in FIG. 7).

Figure 8:
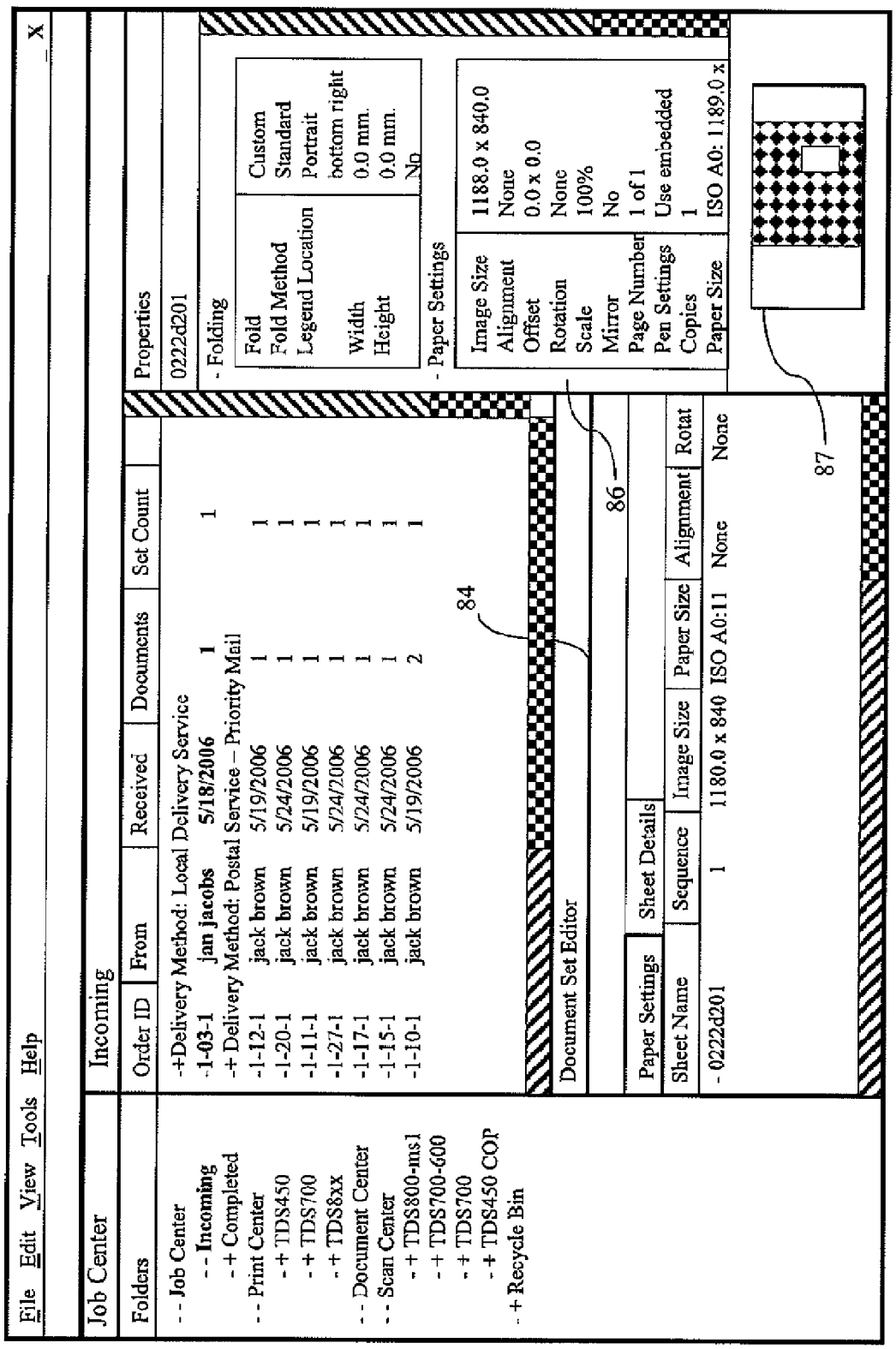
FIG. 8 shows a properties screen of the managing workstation of FIG. 2 displaying properties of a document selected from an incoming job.
Figure 9:
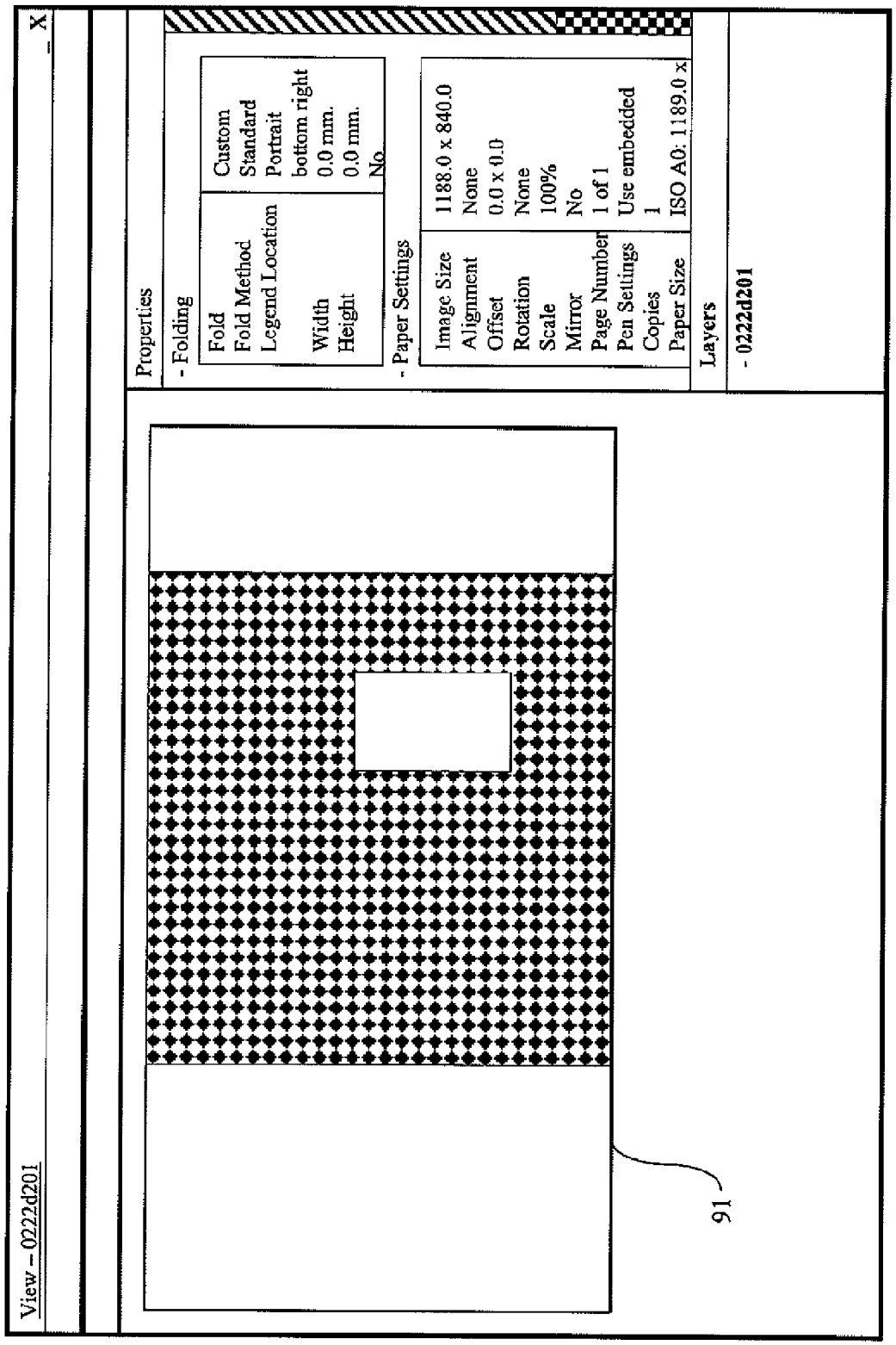
FIG. 9 shows a preview screen displaying a preview of a selected document.

Upon selection of a file in the document set editor pane 84, in the properties pane 86 at the right hand side, properties of the selected file are shown (See FIG. 8). An icon 87 is available for providing a preview of the selected file. The preview 91 is opened in a separate screen as shown in FIG. 9.

A job being defined by way of a document set, wherein each document has its settings regarding printing, may be stored in a document center, for later retrieval and for printing and may be sent to the print center for printing.

Handling of a job is done in the print center. The print center provides complete centralized print management. It enables an operator to, among other things, balance the workload among printers, cancel print jobs, redirect print jobs, reprint jobs, and change print quantities.

Document sets can be dragged from the job center, the document center, and the scan center to the print center (top node 35 in FIG. 3), a printer group or a printer.

The system may be configured to automatically route every print request that arrives in the incoming folder of the job center to the print center. This option may be available as a check box on a job automation dialog box of the job center menu of the options menu in order to activate an automatic move to the print center. In order to prevent the system from routing requests from the top node of the print center to printer groups, the checkbox may be unchecked at the arrival of print requests at the top node 35 of the print center, resulting in turning off the option of automatically moving the print request to the print center.

When a print request arrives at the top node of the print center, the system compares the requirements of the request to the capabilities of the available printer groups. Specifically, the system may check whether each printer group can handle one or more of the following aspects of the request: file formats, folding requirements, media types and media sizes, for example. The print center then routes the request to a suitable printer group based on the result of the check for capabilities, as follows: when exactly one printer group has all capabilities required by a request in the print center, the request is routed to that printer group, when no printer group has all capabilities required by a request in the print center, the request stays at the top node for manual treatment, and when more than one printer group has all capabilities required by a request in the print center, the print center routes the request to the printer group that requires the shortest estimated time to complete the order.

When a print request arrives at a printer group, the system determines which printer or printers to use for each document, based on at least one of the following criteria: file formats supported, media supported and folding capabilities, for example.

Within the printer group, the following rules may apply to assign a file to a printer. When exactly one printer has all required capabilities, the print center routes the request to that printer, when no printer has all required capabilities, the print center does not allow the request to be moved to the printer group, and when more than one printer has all required capabilities, the print center routes the request based on the load balancing property configured for the printer group. In case of parallel load balancing, all printers are used to print an equal number of sets. In case of sequential load balancing, each job is sent to a single printer and the page count of all printers is kept approximately equal. In case of consecutive load balancing, each job is sent to a single printer and a job count of all printers is kept approximately equal.

Figure 11:
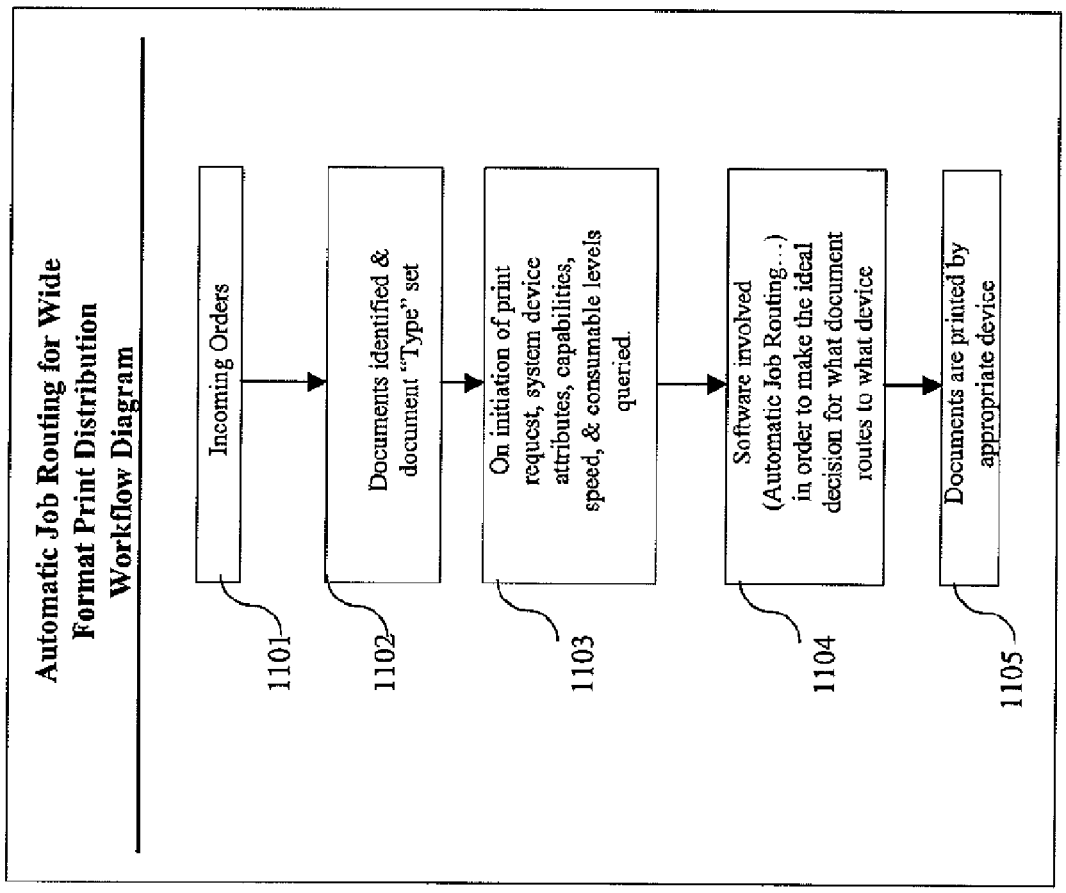
FIG. 11 shows a workflow diagram where preprogrammed configurations are made available by an administrator for a remote customer at a client workstation running a package being part of a publishing system.

FIG. 11 shows a workflow diagram where preprogrammed configurations are made available by an administrator for a remote customer at a client workstation running a package being part of a publishing system. The workflow comprises four steps 1102, 1103, 1104 and 1105. Documents of a couple of incoming orders 1101 are identified and a document type is set (step 1102). On initiation of a print request, system device attributes, capabilities, speed and consumable levels are queried (step 1103). Software is invoked for automatic job routing in order to make the ideal decision for which document routes to which device (step 1104). The documents are printed by appropriate devices (step 1105).

An example of a typical system workflow is provided below.

For printing an order from a plan center, a contractor or another document buyer may visit an online plan room and may order documents that were published there by an architect, engineer, or designer. When synchronization occurs, the order appears in the job center. The order may be dragged to the print center to be printed.

For printing an order in a drop box from a publisher system, an architect, engineer or designer may use a publisher system to locate a drop box and send documents and a work order. When synchronization occurs, the documents and order appear in the job center. Before printing the order, the sender telephones and asks the operator of the system to apply a "Not for construction" stamp to the documents. The documents may be opened in the document set editor, the stamp may be applied, and then the order may be dragged to the print center to be printed.

For printing an order in a drop box from a job submission tool, a construction project manager may use a job submission tool to locate a drop box and send documents and a work order. When synchronization occurs, the documents and order appear in the job center. Because a job submission tool may permit users to send any type of document, the document set editor may be used to make sure that the documents are valid and can be printed. Some of the documents may be PDF color plot files, which the system may not currently process in WYSIWYP (What You See Is What You Print) preview mode. For that reason, the documents may be marked as "Do Not Process" to allow the controller in the printer to process the image. Then, the order is dragged to the print center, which automatically routes the PDF color plot files to a printer that natively supports PDF color processing.

For publishing files to the plan center, a customer may give a CD that contains files and may ask an operator to have them published in the plan center. In the document center, a folder may be created that represents the account and, within that folder, a folder that represents the project. Within the project, an issue may be created and an attribute may be selected to synchronize the issue with the plan center. With the document set editor, the files may be added to the issue, and may be processed to a large document format. When the next synchronization occurs, the documents appear in the plan center online plan room. It may be decided to invite the customer to view, manage, and order the online documents and to invite other users to order them. The operator may log in to the plan center, navigate to the project just created, and enter the customer's name and email address to send an invitation.

For scanning and archiving documents, a customer may provide the operator with printed drawings and may request to scan the drawings and archive the resulting digital scan files. A scan set may be created in the scan center and the drawings are scanned. In the document set editor, the drawings may be indexed and catalogued by setting their sheet name, description, revision, and author. In the document center, a folder may be created that represents the account and, within that folder, a folder that represents the project. Within the project, an issue may be created. The drawings may then be dragged from the document set editor into the issue and the drawings may be deleted from the scan center.

For importing, printing and archiving an older document system, a job file from an older version of a document system may be used in the described system by creating a folder structure in the document center that represents the account, project, and issue. In the document set editor, the job may be imported and the files may be processed. Thus, the documents may be archived. To print a set, the issue may be dragged to the print center.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for dispatching a job for printing one or more original documents from an original document set to a printer, each original document in the original document set having characteristics, the method comprising the step of:
routing a job to a printer group of a plurality of printer groups based on the characteristics of the one or more original documents via a dispatcher, the dispatcher including a notifying device that notifies a user for manual treatment of the job, wherein:
when exactly one printer group of the plurality of printer groups has all capabilities required by the job, routing the job to said one printer group;
when more than one printer group of the plurality of printer groups has all capabilities required by the job, routing the job to a printer group of the plurality of printer groups that requires the shortest estimated time to complete the job; and
when no printer group of the plurality of printer groups has all capabilities required by a job, notifying a user via the notifying device for manual treatment of the job; and
the method further comprising the step of:
routing the job further within the printer group, based on a file format supported by the printer group, media supported by the printer group and folding capabilities of the printer group.

2. The method according to claim 1, wherein:
when exactly one printer of the printer group has all required capabilities required by the job, routing the job to said one printer;
when more than one printer of the printer group has all required capabilities, routing the job based on a load balancing property configured for the printer group, the load balancing property being one of a group consisting of a parallel load balancing property, a sequential load balancing property and a consecutive load balancing property; and
when no printer of the printer group has all required capabilities required by the job, blocking routing of the job to the printer group.

3. The method according to claim 2, wherein:
if the parallel load balancing property has been configured, using all printers in the printer group to print a substantially equal number of sets of the one or more original documents of the original document set;
if the sequential load balancing property has been configured, printing the job on a single printer and keeping a page count of all printers substantially equal; and
if the consecutive load balancing property has been configured, sending the job to a single printer and keeping a job count of all printers substantially equal.

4. The method according to claim 3, wherein the characteristics of the original document comprise a file format of the original document, folding requirements of the original document, media types of the original document and media sizes of the original document.

5. The method according to claim 2, wherein the characteristics of the original document comprise a file format of the original document, folding requirements of the original document, media types of the original document and media sizes of the original document.

6. The method according to claim 1, wherein the characteristics of the original document comprise a file format of the original document, folding requirements of the original document, media types of the original document and media sizes of the original document.

7. The method according to claim 1, wherein the characteristics of the original document comprise a file format of the original document, folding requirements of the original document, media types of the original document and media sizes of the original document.

* * * * *